United States Patent [19]

Clegg

[11] Patent Number: 5,419,695

[45] Date of Patent: May 30, 1995

[54] APPARATUS FOR FORMING A DEVICE FOR USE IN BALLING A TREE

[76] Inventor: Samuel E. Clegg, 909 N. Michigan, Plainfield, Ill. 60544

[21] Appl. No.: 844,784

[22] Filed: Mar. 2, 1992

[51] Int. Cl.[6] ............... B29C 43/46; B29C 59/04
[52] U.S. Cl. ............... 425/296; 264/151; 264/210.1; 425/363; 425/385
[58] Field of Search ............ 425/66, 296, 302.1, 425/327, 335, 363, 385; 264/151, 210.1, 284, 288.4, DIG. 47, 146

[56] References Cited

U.S. PATENT DOCUMENTS

| | | | |
|---|---|---|---|
| D. 102,836 | 1/1937 | McGowen | D3/44 |
| 1,827,447 | 10/1931 | Wilmore | 47/76 |
| 2,022,607 | 11/1935 | Sorensen | 47/76 |
| 2,573,770 | 11/1951 | Meadow | 150/107 |
| 3,127,298 | 3/1964 | Nalle, Jr. | 156/441 |
| 3,161,989 | 12/1964 | Sigler et al. | 47/76 |
| 3,316,675 | 5/1967 | Cartwright | 47/76 |
| 3,384,924 | 5/1968 | Schuetz et al. | 425/385 |
| 3,415,012 | 12/1968 | Stubbmann | 47/78 |
| 3,465,384 | 9/1969 | Barchi et al. | 425/363 |
| 3,488,415 | 1/1970 | Patchell et al. | 264/284 |
| 3,505,157 | 4/1970 | Fields et al. | 264/210.1 |
| 3,622,418 | 11/1971 | Black et al. | 264/151 |
| 3,632,714 | 1/1972 | Fairbanks | 264/167 |
| 3,713,924 | 1/1973 | Fairbanks | 264/167 |
| 3,781,183 | 12/1973 | Doll | 47/78 |
| 3,851,034 | 11/1974 | Harmon et al. | 264/DIG. 47 |
| 3,968,621 | 7/1976 | Poupitch | 264/151 |
| 4,000,344 | 12/1976 | Dilbey | 428/255 |
| 4,020,208 | 4/1977 | Mercer et al. | 264/174 |
| 4,059,713 | 11/1977 | Mercer | 264/167 |
| 4,062,918 | 12/1977 | Nakanose | 264/284 |
| 4,075,379 | 2/1978 | Lloyd | 428/105 |
| 4,276,336 | 6/1981 | Sabee | 264/288.4 |
| 4,287,840 | 9/1981 | Weidner | 47/76 |
| 4,340,557 | 7/1982 | Gross | 264/151 |
| 4,374,798 | 2/1983 | Mercer | 264/DIG. 47 |

*Primary Examiner*—Jay H. Woo
*Assistant Examiner*—Robert B. Davis

[57] ABSTRACT

Apparatus for forming a net device for encompassing a balled end of a tree includes an extruder from which a continuous strip of plastic material is discharged, a compression section for embossing a pattern on at least one surface of the strip, a tensioning section for providing a tension on the pattern strip and a cutting section for cutting the strip into narrow elongate net devices.

6 Claims, 8 Drawing Sheets

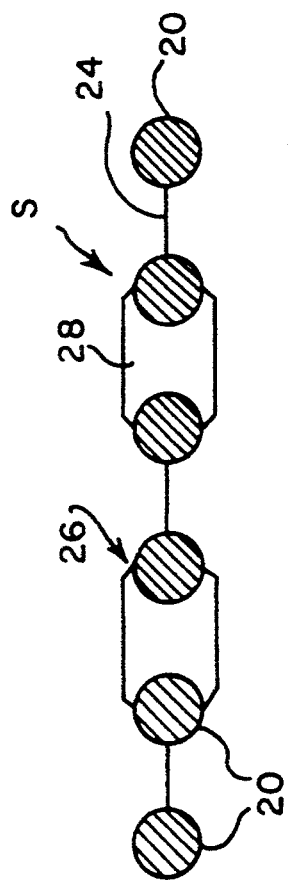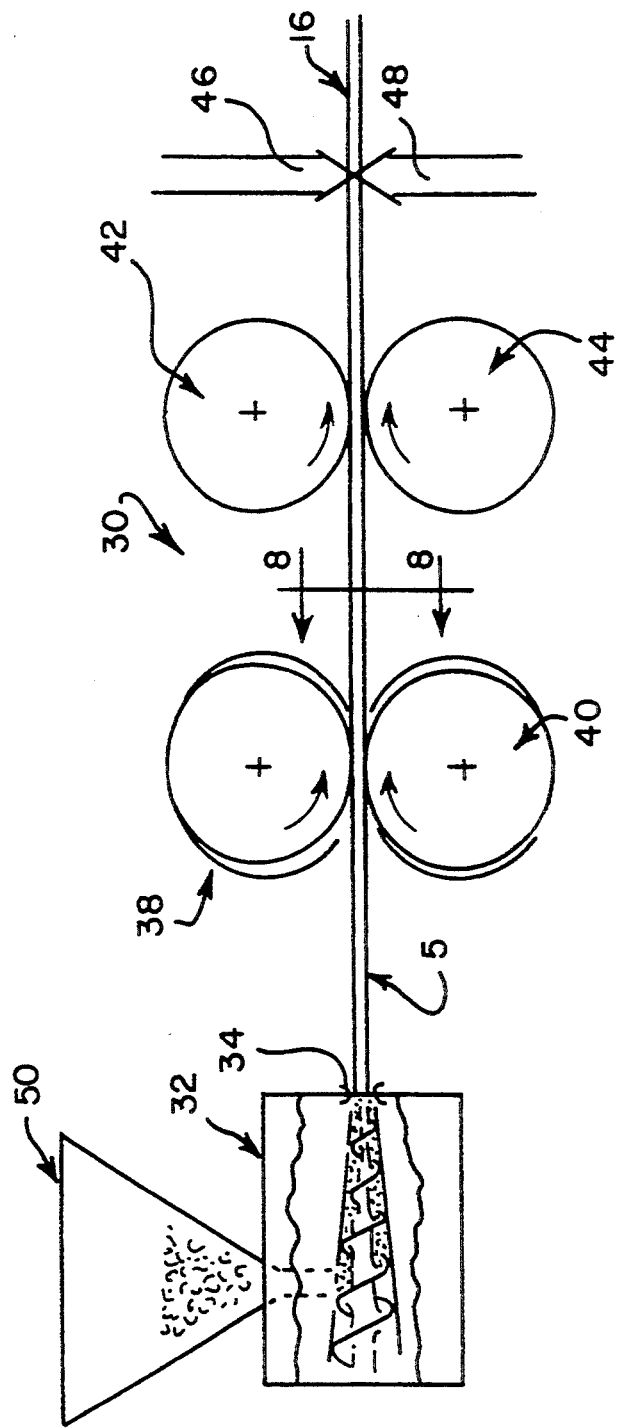

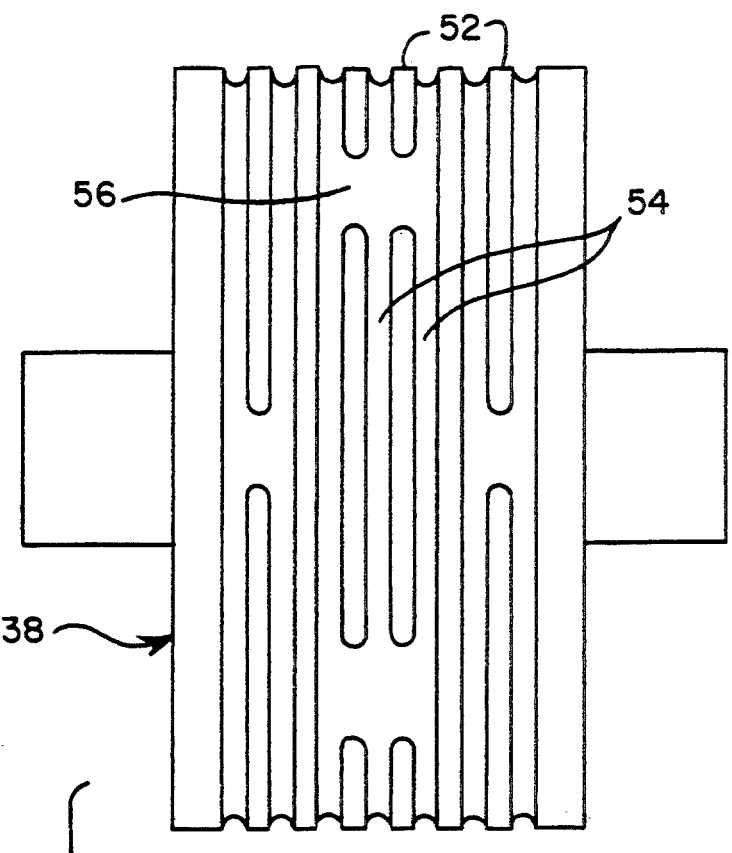
FIG. 7
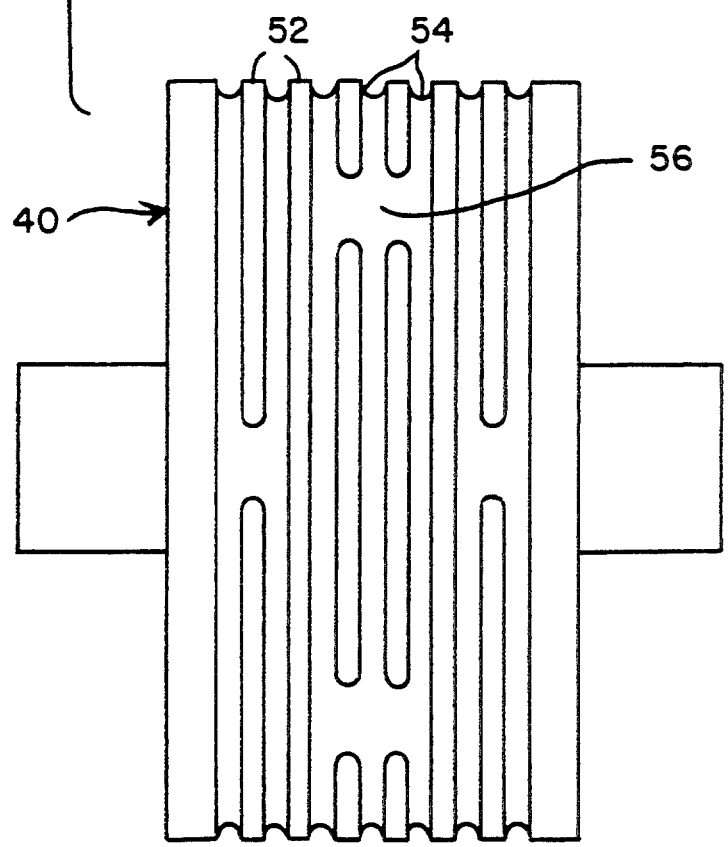

5,419,695

APPARATUS FOR FORMING A DEVICE FOR USE IN BALLING A TREE

FIELD OF THE INVENTION

The invention relates to a net device suitable for maintaining the integrity of the root system contained in the balled end of a tree or other like plant during transplantation and a method of producing such a net device.

BACKGROUND OF THE INVENTION

Maintaining the integrity of the earth and root system of a tree within a balled end thereof is important to successful transplantation particularly if the transplantation occurs after a substantial period of time elapsed following the formation of the balled end and/or the balled tree is to be transported to a remote location. The ball of earth protects the roots from damage thereby increasing the transplantation success rate. Heretofore the ball of earth was customarily wrapped in burlap and then placed in a container having specific dimensions. In many instances the aforementioned containers were wire baskets having preformed shapes. In such a situation it was necessary that the ball of earth be contoured so as to properly fit within the wire basket. While the shape of the wire basket may be manually changed to a limited extent, it was customary and practical nevertheless to utilize a variety of baskets to accommodate earth balls of different sizes and shapes. As the size and shape of the earth ball depended in large measure on the size of the tree to be transplanted and the type of digging tool used, a wide variety of basket styles was required to be inventoried by the nurseryman. Furthermore, the wire baskets and similar containers were bulky and not collapsible and thus required a large storage area. The wire baskets and burlap wrap normally remained with the transplanted tree after planting thereby adding to the cost of the transplantation. Various rope structures were sometimes utilized to bind the burlap wrap to the earth ball. However, such structures were frequently time consuming to produce, were awkward to manipulate at the job site and required an inordinate amount of manual labor to properly apply the structure to the exterior of the earth ball.

SUMMARY OF THE INVENTION

It is an object of the invention to provide a device for maintaining the integrity of the ball of earth that is simple and inexpensive to manufacture and is collapsible, lightweight and versatile in maintaining the integrity of the balled end of the tree which may vary in size and shape over a wide range. The improved net device may be stored or shipped in bulk in a compact flat condition. Because of its flexibility the improved net device will readily conform to the contour of irregularly shaped objects.

In accordance with one embodiment of this invention a net device is provided which is formed from an extruded polymeric strip having an embossed surface pattern which includes a plurality of substantially parallel adjacent strands. Each strand is connected at its ends to adjacent strands by a plurality of longitudinally spaced reinforced segments. In addition, the adjacent strands are initially interconnected by severable web-like sections. When the net device is to be used the web-like sections are torn by an external manual pulling force being applied to opposite elongate sides of the strip. Due to the flexibility of the strip material, the strands will be distorted causing the strip to expand so as to envelop the balled end of the tree.

DESCRIPTION OF THE DRAWINGS

For a more complete understanding of the invention, reference is made to the drawings wherein:

FIG. 3 is an enlarged sectional view taken along line 3—3 of FIG. 2.

FIG. 5 is a schematic representation of one embodiment of an apparatus for producing the strip shown in FIG. 2.

FIG. 7 is an enlarged view of the grooved peripheries of the rollers of FIG. 6 shown in a separated inoperative relation.

DESCRIPTION

Figure 1:
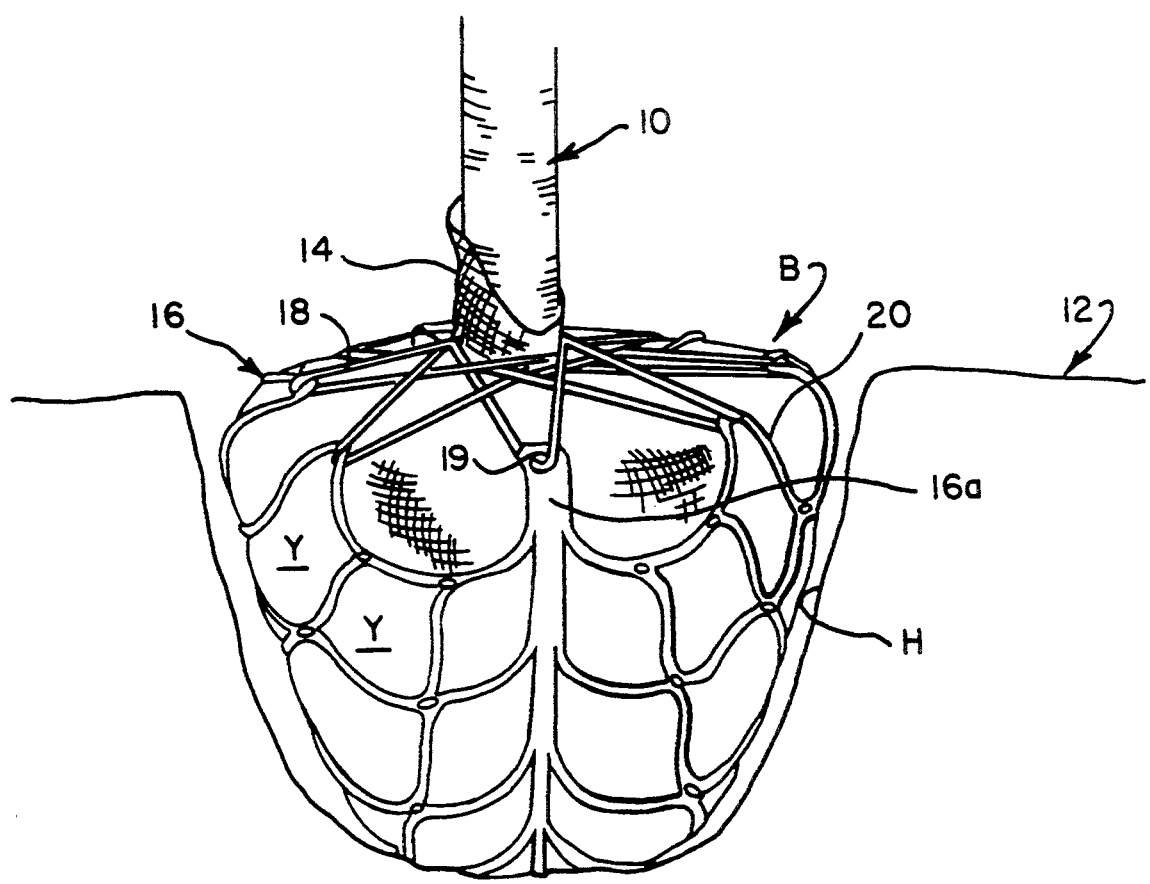
FIG. 1 is a fragmentary perspective view of the balled end of a tree showing a burlap wrap and the improved net device in an expanded operative mode.

FIG. 1 shows a transplanted tree with a balled end B thereof positioned in a hole H dug in the ground 12. The roots of the tree and a predetermined amount of surrounding earth are enclosed within the balled end B; the latter normally including a burlap wrapper 14 which is secured in an encompassing relation with the earth ball by a net device 16 which may be tied to the tree trunk 10 with suitable means such as cords 18. One cord may be threaded through prepunched openings 19 in tongue-like end portions 16a formed in the net device. Other cords are intertwined with predetermined strands 20 forming the net device. In certain embodiments, tongue-like ends with prepunched openings are not included in the net device, in which case all of the cords intertwine with the predetermined strands 20. The burlap wrapper 14 and net device 16 are customarily buried with the tree roots in the ground hole H.

Figure 2:
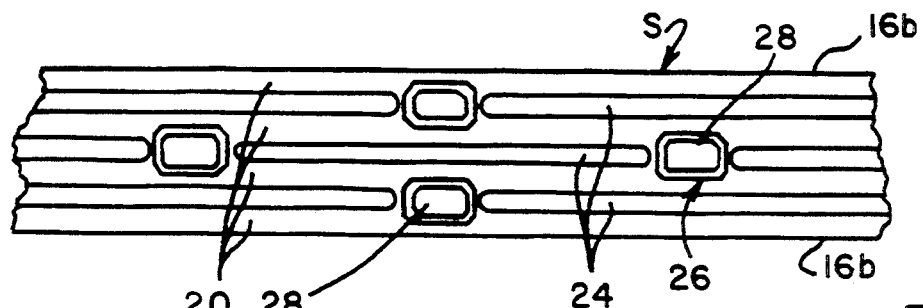
FIG. 2 is a top plan view of a strip segment of the net device of FIG. 1 in a compacted non-expanded mode.
Figure 2A:
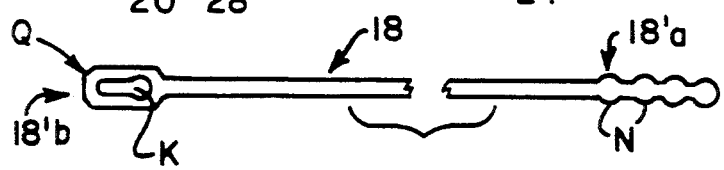
FIG. 2a is a fragmentary top plan view of one embodiment of a tie which may be formed of a suitable plastic material and used to secure the expanded strip to the balled end of a tree.

As seen in FIG. 2a, one or more of the cords may be an elongate tie 18' formed of a suitable plastic material. One end portion 18'a of the tie may be provided with a plurality of longitudinally spaced nubs N. The opposite end portion 18'b of the tie may be provided with an enlarged head Q having a keyhole type slot K formed therein. One end of the slot K is sized to permit the nubs N to pass therethrough.

The net device as shown in FIG. 2 is fabricated as a compact flat strip S of flexible plastic material which is of a predetermined length and includes a plurality of rectilinear strands 20 arranged in proximate substantially parallel relation. Corresponding ends of the strands are transversely connected by segments 26. Portions of the adjacent strands 20 disposed between segments 26 are interconnected by thin web-like sections 24, see FIGS. 2 and 3. The sections 24 and segments 26 are arranged relative to one another so as to initially form a plurality of substantially parallel rows, see FIG. 2.

Figure 4:
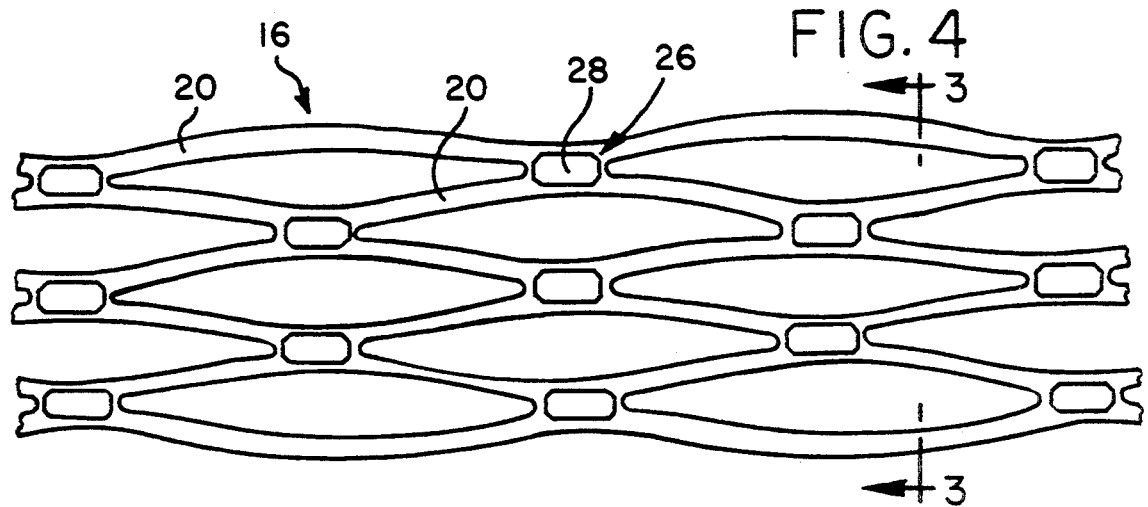
FIG. 4 is similar to FIG. 1 but showing the net device in a partially expanded condition.
Figure 10:
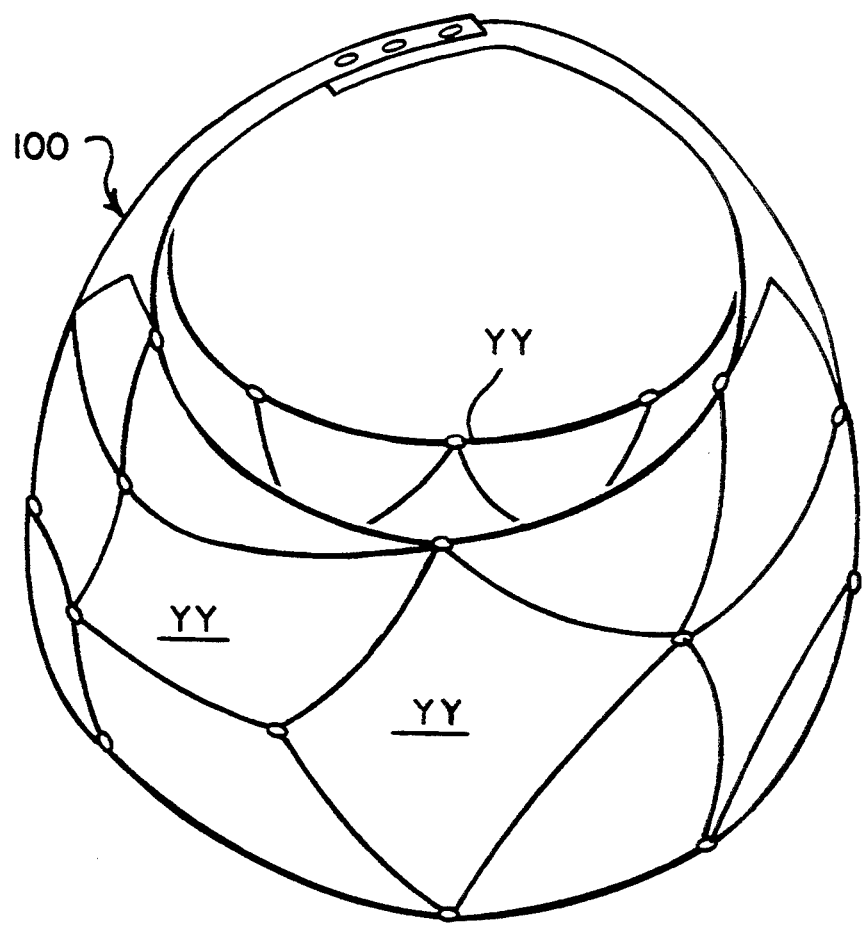
FIG. 10 is a perspective view of the improved net device per se in a fully expanded mode.

The sections 24 may be readily broken or torn manually when desired to enable the device 16 to be expanded to its operative mode, see FIG. 4. The segments 26 are strong enough to withstand the manual pulling force exerted on the opposite elongate side edges of the strip causing the flexible strands to become distorted to the expanded mode as shown in FIGS. 1 and 10. The length of the strands are determined by the spacing between the segments 26.

Figure 4A:
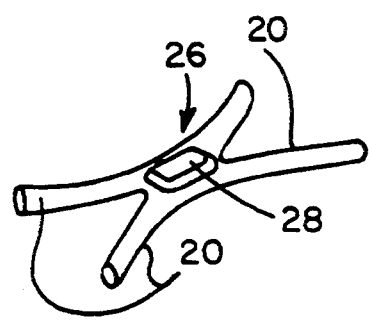
FIG. 4a is a fragmentary perspective view of one reinforced segment of the net device of FIG. 4.

FIG. 4a shows a single segment 26 which includes a thickened reinforcing portion 28 located centrally thereof. Strands 20 extend laterally from both sides of segment 26. The reinforcing portion 28 as well as the remainder of segment 26 may vary in size and shape from that shown. The reinforced segments 26 give added strength to the net strands allowing them to support and distribute the heavy weight of the earth ball when the net device is in its expanded operative mode.

When applying the net device around the balled end B of the tree, the adjacent strands 20 of the net device may be initially manually pulled apart until the intervening web-like sections 24 are torn. The net device with the separated strands is then placed under the tree balled end while the latter is in a slightly elevated position with respect to the ground level.

In some instances the aforedescribed step of separating the individual strands of the net device before the latter is placed under the balled end may be omitted whereupon the net device with the non-separated strands may be initially placed under the balled end. The opposite elongate sides 16b of the subtending net device are then manually pulled apart whereupon the net device will expand sufficiently so that it will substantially encompass or envelop the balled end B in a manner as shown in FIG. 1. Because of the flexibility of the strands and the locations of the interconnecting segments 26, the expanded net device forms a plurality of randomly shaped openings Y and readily conforms to the shape of the balled end with a minimum amount of manual effort being exerted. The opposite ends 16a of the net device 16 may have tongue-like configurations with each end having the aforementioned pre-punched hole 19 formed therein, see FIG. 1. When the net device is drawn up tight around the balled end, see FIG. 1, the ends 16a are substantially diametrically opposed to one another and on opposite sides of the tree trunk T. The ends of cord 18 or tie 18' are then threaded through each hole 19 and around the tree trunk, thus holding the expanded net device in place.

Once the net ends 16a are secured in place the additional cords 18a are interlaced with the uppermost strands 20 and coact with the ends 16a of the strip to secure the net device to the tree trunk as seen in FIG. 1. It is preferred that the cords 18a engage the strands at the locations of the reinforced segments 26.

The net device 16 is preferably formed from a single extruded strip of polymeric material such as a blend of high and low density polyethylene having a density of 0.927. Such material may have a melt index of 0.67, and heat of fusion of 135 joules per gram and a melting temperature of about 114° F. Other plastic materials within a density range of about 0.918 to about 0.963 such as polyolefin or Nylon may be used as the net device material.

Referring now to FIG. 5, one embodiment 30 of an apparatus is shown for producing the net device 16. Apparatus 30 includes the following basic components: a hopper-fed extruder 32 having an orifice 34 from which the continuous strip S of material is discharged; a pair of forming rollers 38, 40 located downstream of the orifice and between which the strip passes whereupon a predetermined pattern is impressed thereon; a pair of tension rollers 42, 44 located downstream of the forming rollers between which the patterned strip passes; and a pair of cutting blades 46, 48 downstream of the tension rollers.

The hopper-fed extruder 32 may be of conventional design and includes a hopper 50 for receiving the plastic material in pellet form. From the hopper the pellets are fed to the orifice 34 which may be dimensioned to produce a continuous strip having a thickness of about ¼" and a width which will be determined by the number of strands 20 to be formed in the strip by the forming rollers 38, 40. Each strand preferably has a width of about 1/8". The strip when leaving the orifice 34 is hot and therefore is cooled to a predetermined temperature so as to permit the strip to be readily patterned by the forming rollers. Cooling of the strip may be accomplished by a cooling bath, not shown. A gas heater, not shown, may be utilized within the extruder.

Figure 6:
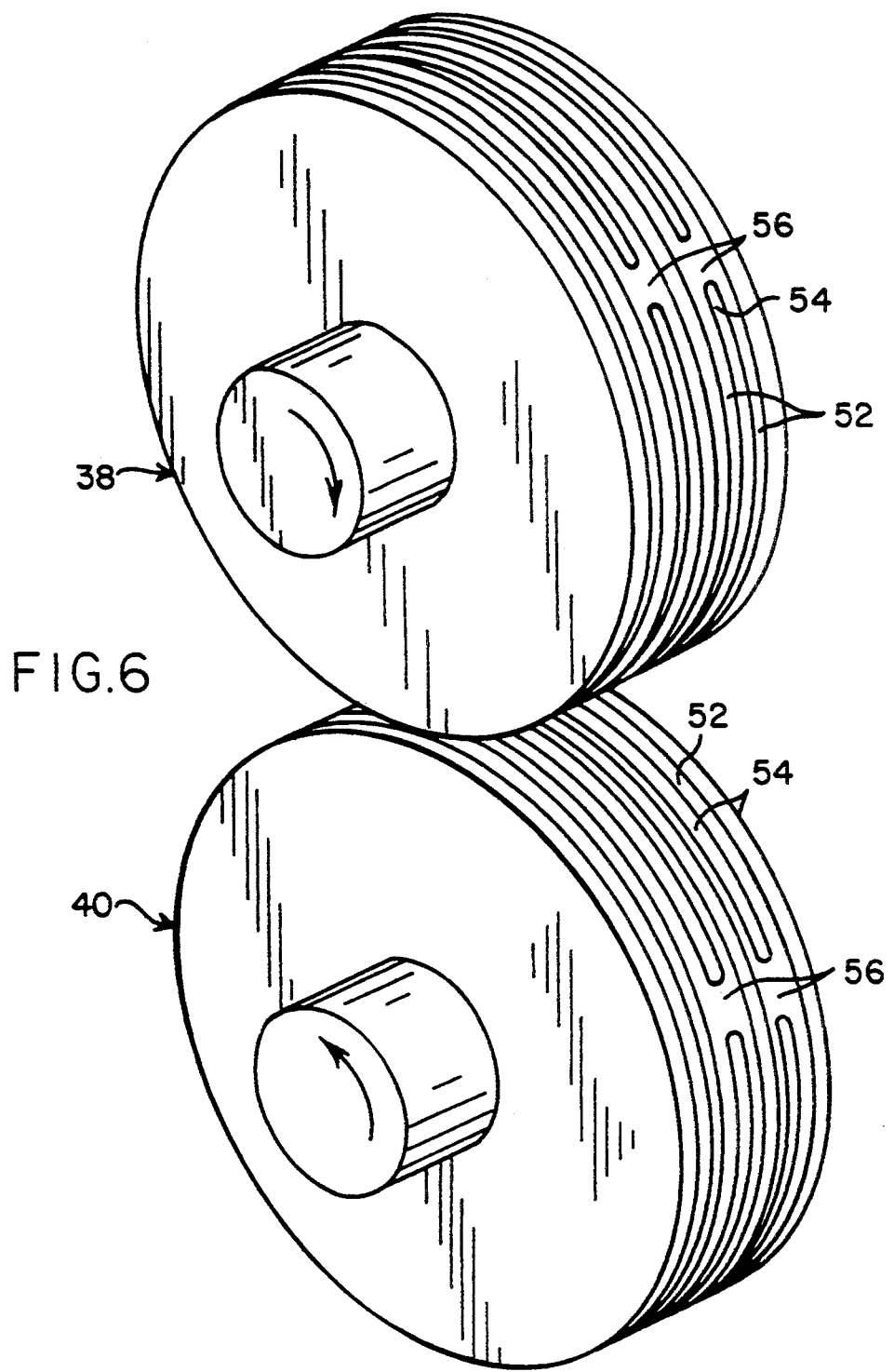
FIG. 6 is an enlarged perspective view of a pair of patterned rollers embodied in the apparatus of FIG. 5.

As seen in FIGS. 6 and 7 each forming roller 38, 40 has an annular periphery provided with ridges 52 and grooves 54. The ridges and grooves for each roller are disposed on the periphery in a predetermined arrangement so that when the strip, at the desired temperatures, passes between the rollers 38, 40 the desired pattern, see FIG. 2, is embossed on the opposing surfaces of the strip. As the strip is compressed between the rollers, excess plastic material accumulates just ahead of where the roller peripheries engage the strip and thus orients the plastic molecules into the desired shapes of the strands 20, interconnecting segments 26 and web-like sections 24. The number of strands to be initially formed determines the number of grooves provided in the annular peripheries of the rollers.

As seen in FIG. 6, the ridges 52 formed in the peripheries of the rollers 38 and 40 are provided with longitudinally spaced indentations 56 which produce the reinforced portions 28 of the segments 26. The depth and size of the indentations 56 determine the extent to which the segments 26 are reinforced. The relative location of the indentations on the adjacent strands 20 determines the ultimate configuration of the expanded net device.

Furthermore, the size of the openings Y in the expanded net device 16 is determined to a large extent by the diameter of the rollers 38 and 40 and the number of indentations 56 formed in each ridge 52. The largest openings Y of an expanded net device are obtained from a given roller with only a single indentation provided in each ridge. The number of indentations per ridge may be varied according to the size of the openings desired.

The grooves 54 between adjacent ridges 52 are preferably half-round in cross section allowing the formed strands to be round in cross section and thus, easily slide over the exposed surface of the burlap wrap 14 when the net device is being applied to the balled end of the tree. If desired, however, the cross sectional shape of the strands may be varied from that shown.

Figure 8:
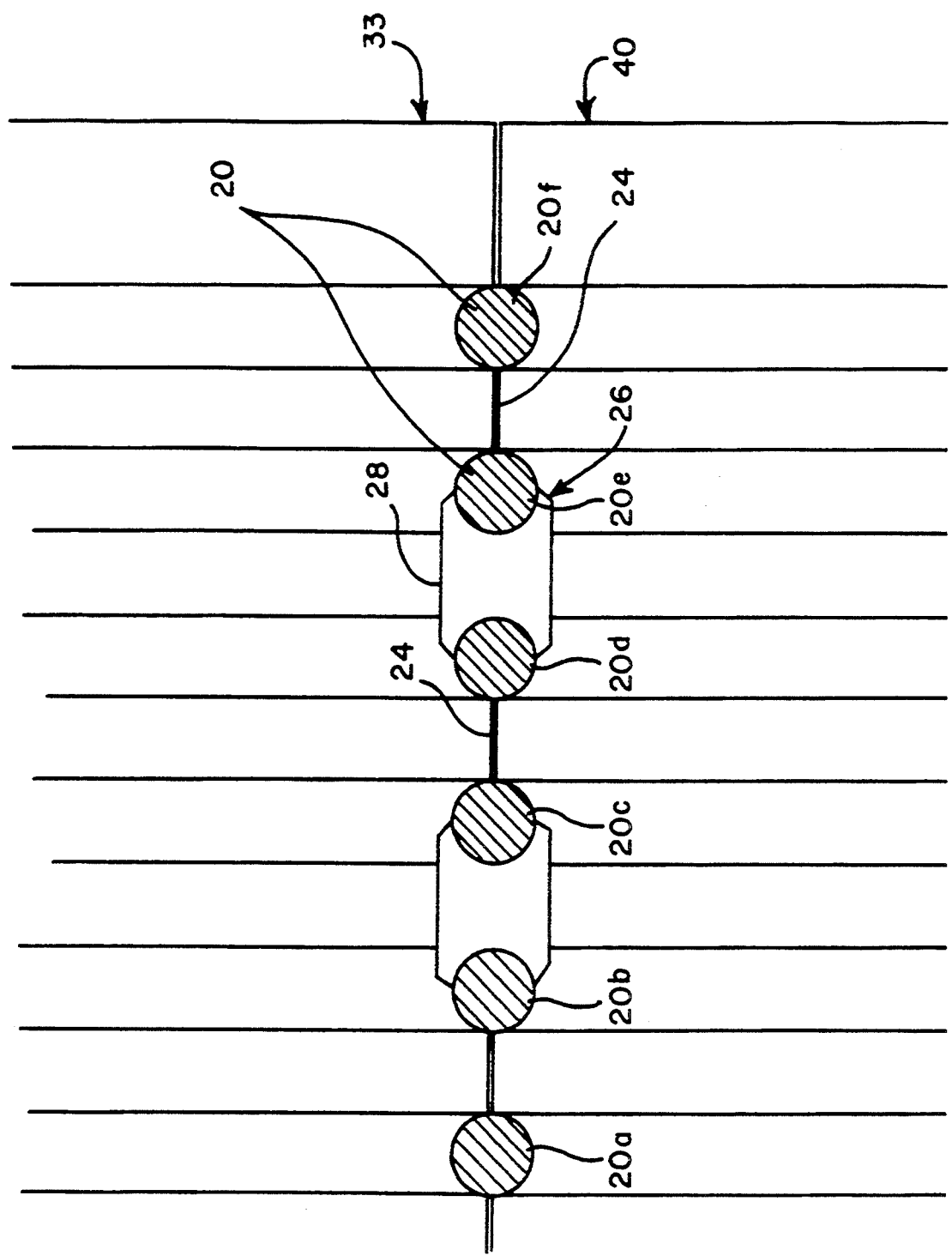
FIG. 8 is an enlarged fragmentary sectional view taken along line 8—8 of FIG. 5.
Figure 9:
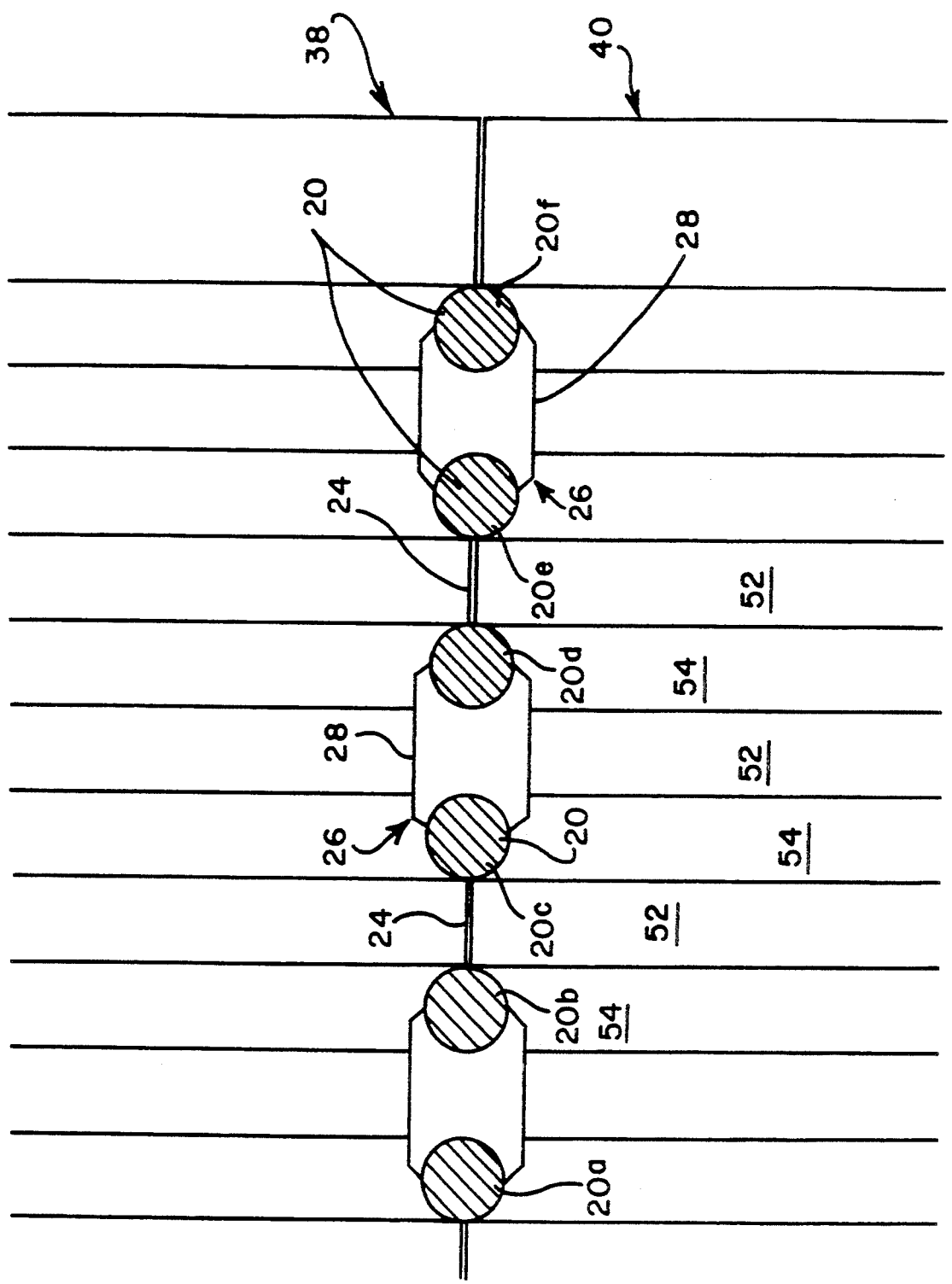
FIG. 9 is similar to FIG. 8 but with each roller having been rotated substantially 180° from the position shown in FIG. 8.

FIGS. 8 and 9 show two relative positions of the indentations 56 on the rollers 38 and 40 for producing the net device 16 shown in FIG. 2. FIG. 8 illustrates the product as formed at a position on the circumference of rollers 38 and 40 where the central strands 20c and 20d are connected only by the web-like sections 24, the intermediate strands 20b and 20e are connected to central strands 20c and 20d, respectively, by segments 26. At no location are there segments connected to the outside edges of the outer strands 20a or 20f. The product formed at the alternate roller positions is shown in FIG. 9 where outer strands 20a and 20f are shown connected, respectively, to strands 20b and 20e by segments 26, again without segments connected to the outer edges of the outer strands 20a and 20f. The rollers cooperate with one another to emboss the strip in a simple and expeditiously manner. As an alternative the apparatus may substitute for the rollers 38, 40 a pair of dies each having a plurality of complemental ridges and grooves between which an extruded sheet of plastic material is compressed to form the desired pattern.

Once the extruded strip has been compressed between rollers 38 and 40 it passes between a pair of rollers 42 and 44 which provide the desired tension to the patterned strip. The tension is applied as the strip cools thereby effecting further orientation of the polyethylene molecules to increase the over-all strength of the resultant net device. A pair of cutting blades 46 and 48 may be provided to cut the strip into individual net devices of predetermined lengths.

FIG. 10 illustrates the device 16 in a fully expanded mode wherein it may serve as a carrying case 100 to accommodate a variety of articles. The case 100 may be produced by the apparatus and materials heretofore described. One difference between the case 100 and the net device 16 is that in case 100 the openings YY may be smaller and in greater number than the openings Y formed in the net device 16.

While a preferred method, apparatus, and net device have been described heretofore, the invention is not intended to be limited thereto.

What is claimed is:

1. An apparatus for forming a net device for encompassing a balled end of a tree while the latter is being transplanted, said apparatus comprising:

an extruder having an orifice from which a continuous strip of heated flexible plastic material is discharged;

compression means for receiving the strip from said orifice in a heated condition for embossing a predetermined pattern on at least one surface of the strip, said pattern including a plurality of elongate strands of generally the same cross sectional area arranged in substantially side by side relation, longitudinally spaced segments interconnecting end portions of adjacent strands, and laterally extending severable sections interconnecting portions of adjacent strands disposed between said segments;

tension means for receiving the strip from said compression means in a heated condition for exerting tension on the patterned strip adequate for stress strengthening throughout its length; and cutting means disposed downstream of said tension means for cutting the tensioned strip into narrow elongate net devices of predetermined lengths.

2. The apparatus of claim 1 wherein the compression means includes a pair of rollers mounted for rotation about spaced axes, said rollers having peripheral portions in proximate relation and adapted to be in compressive engagement with the continuous strip as the latter moves therebetween; at least one of the peripheries of said rollers being provided with complementary ridges and indentations cooperating to effect embossment of the predetermined pattern on at least one elongate surface of the strip.

3. The apparatus of claim 2 wherein a first set of indentations is shaped to form the strands of the pattern and a second set of indentations is shaped to form the longitudinally spaced segments interconnecting the end portions of adjacent strands.

4. The apparatus of claim 3 wherein at least portions of the second set of indentations have a greater depth than the first set of indentations.

5. The apparatus of claim 2 wherein at least portions of corresponding ridges of said rollers are shaped to cooperate with one another forming the severable web-like sections of the predetermined pattern.

6. The apparatus of claim 2 wherein the outermost ridges forming said pattern are continuous and substantially straight over the length of said net device.

* * * * *